US011088969B1

(12) United States Patent
van Doorn et al.

(10) Patent No.: US 11,088,969 B1
(45) Date of Patent: Aug. 10, 2021

(54) CALENDAR BASED AUTO-REPLY MESSAGES

(71) Applicant: Amazon Technologies, Inc., Seattle, WA (US)

(72) Inventors: Ivo van Doorn, The Hague (NL); Naomi Jane de Jonge, Zuid (NL)

(73) Assignee: Amazon Technologies, Inc., Seattle, WA (US)

( * ) Notice: Subject to any disclaimer, the term of this patent is extended or adjusted under 35 U.S.C. 154(b) by 572 days.

(21) Appl. No.: 14/743,443

(22) Filed: Jun. 18, 2015

(51) Int. Cl.
*G06F 15/16* (2006.01)
*H04L 12/58* (2006.01)

(52) U.S. Cl.
CPC .................. *H04L 51/02* (2013.01)

(58) Field of Classification Search
CPC ......... G06Q 10/00; H04L 51/02; H04L 67/22; H04L 51/22; H04L 51/32
USPC ............................................ 389/88; 709/206
See application file for complete search history.

(56) References Cited

U.S. PATENT DOCUMENTS

| | | | |
|---|---|---|---|
| 2005/0021636 A1* | 1/2005 | Kumar | G06Q 10/107 709/206 |
| 2008/0133302 A1* | 6/2008 | Brauninger | G06Q 10/109 379/88.19 |
| 2009/0113342 A1* | 4/2009 | Bank | H04L 51/043 715/808 |
| 2009/0228806 A1* | 9/2009 | Kadashevich | G06Q 10/1093 715/747 |
| 2013/0036369 A1* | 2/2013 | Mitchell | G06Q 50/00 715/753 |
| 2013/0232211 A1* | 9/2013 | Bocking | H04L 51/38 709/206 |
| 2014/0129648 A1* | 5/2014 | Bos | G06Q 10/107 709/206 |
| 2014/0342762 A1* | 11/2014 | Hajdu | H04M 1/72552 455/466 |

OTHER PUBLICATIONS

"Outlook: Show Calendar As Busy, Free, Tentative, And Out Of Office", Wayback Machine date Nov. 14, 2014.*
(Continued)

*Primary Examiner* — Oscar A Louie
*Assistant Examiner* — Messeret F Gebre
(74) *Attorney, Agent, or Firm* — Lee & Hayes, P.C.

(57) ABSTRACT

Functionality is disclosed for defining an auto-reply message while defining an appointment on a calendar associated with a user. A request may be received by way of a personal information management (PIM) client application to define a new appointment on a calendar associated with a user. A UI for defining the new appointment may be presented that includes a UI control for defining a time period for the new appointment and a UI control for defining an auto-reply message to be transmitted in response to email messages received during the time period. In response to the user defining the appointment and the auto-reply message, a request may be transmitted to a PIM server application to create the appointment along with an auto-reply message definition that defines the auto-reply message. The auto-reply message is then transmitted in response to email messages received during the time period associated with the meeting.

21 Claims, 15 Drawing Sheets

(56) References Cited

OTHER PUBLICATIONS

P. Anthony and O. Y. Wool, "Calendar agent with commonsense reasoning," 2011 Malaysian Conference in Software Engineering, Johor Bahru, Malaysia, 2011, pp. 399-403 (Year: 2011).*

Halstead, J. B., & Brown, D. E. (2004). Improving upon logistic regression to predict united states army delayed entry program (DEP) losses Retrieved from https://dialog.proquest.com/professional/docview/832714170?accountid=131444 (Year: 2004).*

L. Pajunen and S. Chande, "Developing Workflow Engine for Mobile Devices," 11th IEEE International Enterprise Distributed Object Computing Conference (EDOC 2007), Annapolis, MD, USA, 2007, pp. 279-279 (Year: 2007).*

\* cited by examiner

FIG. 3

| MAY 2015 | | | CALENDAR | | | ☐✖ |
|---|---|---|---|---|---|---|
| SUNDAY | MONDAY | TUESDAY | WEDNESDAY | THURSDAY | FRIDAY | SATURDAY |
| APR 26 | 27 | 28 | 29 | 30 | MAY 1 | 2 |
| 3 | 4 | 5 | 6 | 7 — 11:00 AM MEETING (302) | 8 | 9 |
| 10 | 11 | 12 — 9:00 AM MEETING | 13 | 14 | 15 | 16 |
| 17 | 18 — 11:30AM MEETING | 19 | 20 | 21 | 22 | 23 |
| 24 | 25 — 11:00AM PHONE / 3:00 PM DOCTOR | 26 | 27 | 28 | 29 — 12:30PM LUNCH (304) | 30 |
| 31 | JUN 1 | 2 — OUT OF OFFICE | 3 — OUT OF OFFICE | 4 — OUT OF OFFICE | 5 — OUT OF OFFICE | 6 |

300

| VIEW AUTO-REPLY MESSAGES | | | | |
|---|---|---|---|---|
| ↑↓ MAY 2015 | | | | |
| START DATE / TIME | END DATE / TIME | SUBJECT | | |
| 5/12/2015, 7:00 AM | 5/12/2015, 2:00 PM | MEETING WITH JOHN | EDIT | DELETE |
| 5/25/2015, 1:00 PM | 5/25/2015, 3:00 PM | DOCTOR APPOINTMENT | EDIT | DELETE |
| 5/30/2015, 1:00 PM | 5/30/2015, 4:00 PM | MEETING WITH JANE | EDIT | DELETE |

400 — 404 (EDIT) — 406 (DELETE)

CALENDAR BASED AUTO-REPLY MESSAGES

BACKGROUND

Within many email client applications, it is usually possible to define an auto-reply message. Also sometimes termed as an "out of office" ("OOF") message or an "auto-response message," an auto-reply message can be defined by a user for an associated user account, for example, for a specific time period. Whenever the user account receives an email within the specified time period, an email server application automatically transmits a reply email that includes the auto-reply message defined by the user.

Usually, an auto-reply message can be defined by a user via a user interface ("UI"), which is specifically configured to define auto-reply messages. In an example, if a user is scheduled to be on vacation for a specific period of time (e.g., for an entire week), the user usually sets up a calendar appointment for the meeting via a UI specifically configured for creating calendar appointments. Furthermore, if the user desires to set up an auto-reply message for the period of time, the user has to also define an auto-reply message for the period of time via another UI specifically configured for creating auto-reply messages. This, to an extent, involves duplication of labor, as the user has to input similar details in both UIs. Moreover, because multiple actions are required by the user to define both an appointment (e.g. their vacation) and the corresponding auto-reply message, it is not uncommon for users to forget to create auto-reply messages.

The disclosure made herein is presented with respect to these and other considerations.

BRIEF DESCRIPTION OF THE DRAWINGS

FIG. 3 is a UI diagram that illustrates a calendar displayed by the PIM client application on the client device, according to one embodiment disclosed herein;

FIG. 4 is a UI diagram that illustrates a UI for viewing auto-reply message definitions, according to one embodiment disclosed herein;

FIG. 5A is a UI diagram that illustrates a calendar displayed by the PIM client application on the client device, according to one embodiment disclosed herein;

DETAILED DESCRIPTION

Figure 1:
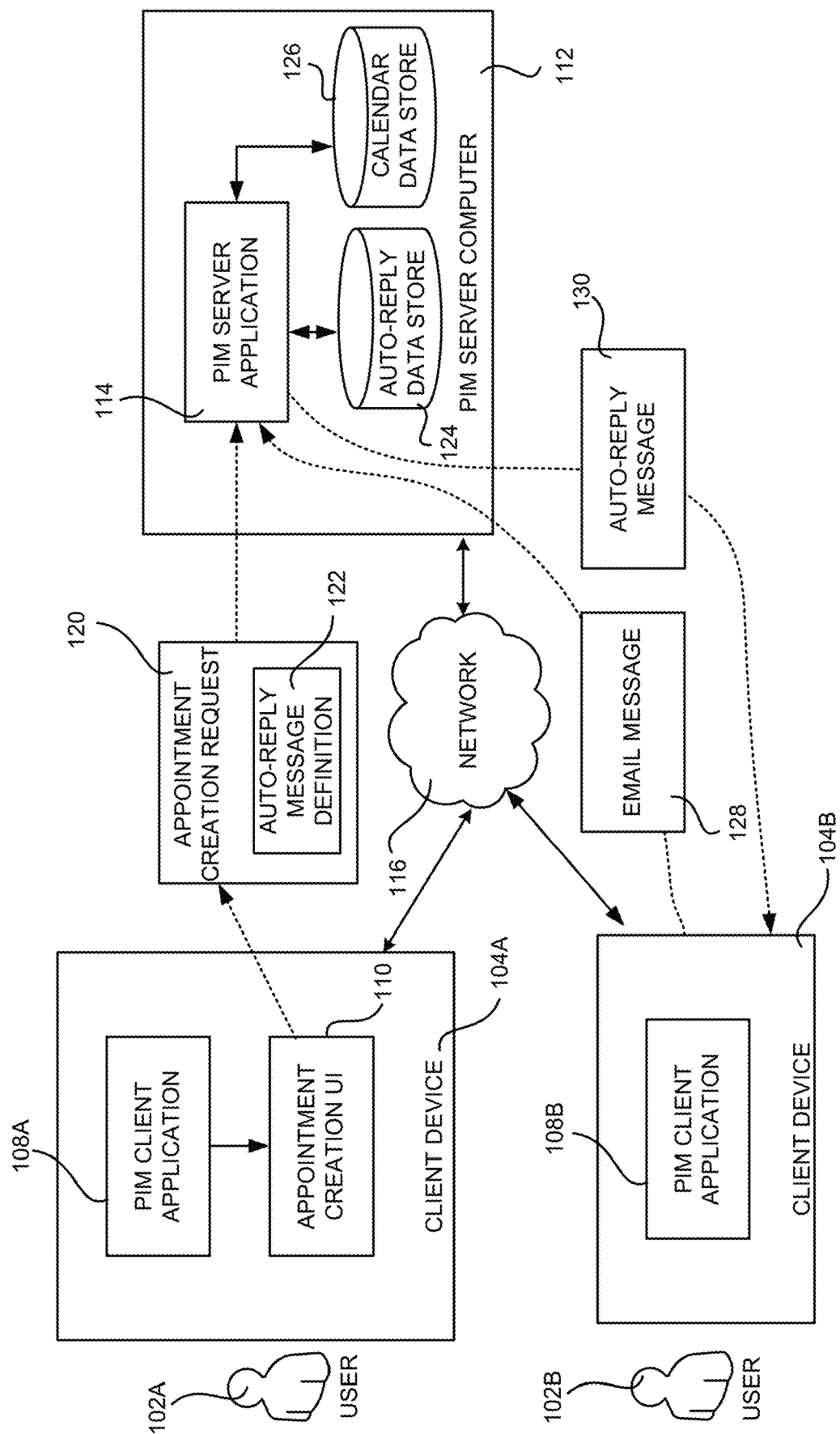
FIG. 1 is a system architecture diagram showing aspects of the configuration and operation of several components described herein for providing calendar based auto-reply message definition, according to one embodiment.

The following detailed description is directed to technologies for defining an auto-reply message while defining a calendar appointment. Utilizing the technologies described herein, a user of a personal information management ("PIM") client application may be provided with a greater level of flexibility in defining auto-reply messages than previously available. For example, and without limitation, a PIM client application may execute on a client device. The PIM client application may present an appointment creation UI on the client device to define a new appointment on a calendar associated with a user. The appointment creation UI may provide a UI control to define a time period for the new appointment. The same appointment creation UI may also provide another UI control to define an auto-reply message for messages received during the time period of the appointment. A default time period for the auto-reply message may be same as the time period defined for the new appointment, but the user may also be presented with different time periods to select for the auto-reply message, which may be determined based on the characteristics of the appointment (e.g., type of the appointment, date and time of the appointment, etc.). Thus, the user may define both the new appointment on a calendar and the auto-reply message via the same appointment creation UI. Furthermore, as the time period for the new appointment is also used as the default time period for the auto-reply message, the user need not enter the same time period twice as required by previous solutions, thereby avoiding the duplication of labor described above.

In an example, the appointment creation UI includes a UI control to change the default time period of the auto-reply message. For example, a user may be busy in a day-long meeting on May 2, 2015, from 9:00 AM to 4:30 PM, and the new appointment may be set for this time period. The UI control for defining a time period for the auto-reply message may set May 2, 2015, from 9:00 AM to 4:30 PM as the default time period for the auto-reply message. The UI control for defining the time period for the auto-reply message may also provide an option for setting up an end time for the auto-reply message to coincide with an end time of the business day of May 2, 2015, which may be, for example, 5:00 PM. The UI control for defining the time period for the auto-reply message may also provide an option for setting up a start time of the auto-reply message to coincide with a start time of the business day of May 2, 2015, which may be, for example, 8:00 AM. The UI control may also provide an option to manually set the time during which the auto-reply message is to be transmitted.

In another example, a user may set an appointment for a vacation from Monday, Jun. 15, 2015 to Friday, Jun. 19, 2015. However, it is likely that the user may be out on vacation from Friday evening or Friday night (although the user may set in the calendar that the vacation starts from Monday). So, the UI control for defining the time period for the auto-reply message may also provide an option for setting up a start time of the auto-reply message to coincide with the end time of the previous business day, e.g., 5:00 PM of Friday, Jun. 12, 2015. For example, the PIM client application may analyze the appointment to determine a type of the appointment (which, in this example, may be categorized as a vacation or as being multiple days out of office). Based on such a categorization, the PIM client application may provide an option for setting up the start time of the auto-reply message to coincide with the end time of the previous business day. In a similar manner, in the above example, the PIM client application may provide an option for setting up the end time of the auto-reply message to coincide with the start time of the next business day, i.e., at 8:00 AM of Monday, Jun. 22, 2015 (e.g., based on an assumption that the user may return from the vacation on Sunday evening or night, and may not want to reply to e-mail messages before resuming office on Monday morning). The user may, instead of selecting these pre-set options for the start and end date/time, select different start and/or end date/time for the auto-reply message. The appointment creation UI may also provide various other UI controls to define various other options/settings associated with the new appointment and/or the auto-reply message.

Once the user defines the new appointment and the associated auto-reply message via the appointment creation UI described above, the PIM client application executing on the client device may transmit an appointment creation request to a PIM server application. The appointment creation request may include a request to create the new appointment. In an example, the appointment creation request may also include an auto-reply message definition that defines the auto-reply message. The auto-reply message definition, for example, may include the auto-reply message, a time period for which the auto-reply message is to be active, and various other parameters associated with the auto-reply message (e.g., whether the auto-reply message is to be transmitted to senders inside an organization with which the user account is associated, whether the auto-reply message is to be transmitted to senders outside the organization, and/or the like).

Once the PIM server application receives the appointment creation request, along with the auto-reply message definition, the PIM server application may store the auto-reply message definition. In an example, the PIM server application may store the auto-reply message definition in a data store that stores auto-reply message definitions and orders the stored auto-reply message definitions by the date and time associated with the auto-reply message definitions. In another example, the PIM server application may store the auto-reply message definition, along with the appointment request, in a data store that stores appointments and any associated auto-reply message definitions.

Whenever the PIM server application receives an email directed to the user account, the PIM server application may check the data store to determine if an auto-reply message definition is active at the time the email is received. If, for example, an auto-reply message definition is active, the PIM server application may transmit a reply email to the sender of the original email message, the reply email including the auto-reply message.

In an example, the technologies disclosed herein can be utilized with other applications other than PIM client/server applications. For example, the technologies disclosed herein can be used to provide auto-reply messages to messages other than emails, e.g. to provide auto-reply messages to instant messages (IM), text messages, messages that are posted on a social networking website, etc. In an example, the technologies disclosed herein can also be implemented in conjunction with a web site that provides calendar and mail functionality.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for providing a calendar based auto-reply message definition. As illustrated in FIG. 1, a PIM client application 108A may execute on a client device 104A. The client device 104A may be an appropriate computing device on which a PIM application may execute, such as a smart phone, a tablet computer, a personal digital assistant (PDA), a laptop or desktop computer, or any other appropriate type of computing device.

The PIM client application 108A may provide various PIM functionalities to a user 102A of the client device 104A. For example, the PIM client application 108A may enable the user 102A to view or compose email messages, view a calendar, set up an appointment on the calendar, add or view tasks, add or view notes, and/or the like. For example, the PIM client application 108A provides various functionalities that are usually available in a typical PIM application.

In an example, the system architecture of FIG. 1 further includes a PIM server computer 112 running a PIM server application 114. The PIM server computer 112 may represent one or more server computers. For example, the PIM server computer 112 may include one or more processors and memory that stores various modules, applications, programs, or other data (e.g., PIM server application 114). For example, the memory in the PIM server computer 112 may include instructions that, when executed by the processors in the PIM server computer 112, cause the processors to perform one or more operations described herein. In an example, the memory of the PIM server computer 112 may store the PIM server application 114. In an example, the memory of the PIM server computer 112 may also store an auto-reply data store 124 and/or a calendar data store 126.

In an example, the client device 104A and the PIM server computer 112 are interconnected via a network 116. The network 116 may be a wireless or a wired network, or a combination thereof. The network 116 may be a collection of individual networks interconnected with each other and functioning as a single large network (e.g., the Internet or an intranet). Examples of such individual networks include, but are not limited to, telephone networks, cable networks, Local Area Networks ("LANs"), Wide Area Networks ("WANs"), and Metropolitan Area Networks ("MANs"). Further, the individual networks may be wireless networks, wired networks, or a combination thereof.

In an example, in addition to the client device 104A, the system architecture of FIG. 1 may also include one or more other client devices, e.g., client device 104B. The client device 104B may execute a PIM client application 108B. The PIM client application 108B executing on the client device 104B may be accessed by a user 102B.

In an example, the PIM client application 108B may be at least in part similar to the PIM client application 108A. For example, the PIM client applications 108A and 108B may be provided by the same service provider, have one or more similar functionalities, etc. In another example, the PIM client application 108B may be different from the PIM client application 108A. For example, the PIM client applications 108A and 108B may be provided by different developers, provide different functionality, etc.

In an example, the user 102A may be logged in the PIM client application 108A using a first user account. In an example, the PIM client application 108A may present an appointment creation UI 110 to the user 102A, in response to the user 102A requesting creation of a new appointment via the PIM client application 108A. The user 102A may define a new appointment via the appointment creation UI 110. Along with defining the new appointment, the user 102A may also define an auto-reply message using a UI control of the appointment creation UI 110. In response thereto, the PIM client application 108A may generate an auto-reply message definition 122 that defines the auto-reply message associated with the new appointment. In response to the user defining the new appointment via the appointment creation UI 110, the PIM client application 108A may transmit an appointment creation request 120 to the PIM server application 114, e.g., via the network 116. In an example, the appointment creation request 120 may include the auto-reply message definition 122.

As described briefly above, the PIM client application 108A may enable the user 102A to view or compose emails, view a calendar, set up an appointment on the calendar, add or view tasks, add or view notes, and/or the like. Assume a scenario in which the user 102A desires to set up a new appointment on a calendar associated with the user and maintained by the PIM server application 114. The user 102A may request to set up the new appointment via a UI control in a UI presented by the PIM client application 108A. Merely as an example, the PIM client application 108A may present a UI that displays a calendar on the client device 104A. The user 102A may select a specific date in the calendar, and request to set up an appointment for that specific date. In response to the user requesting to set up an appointment, the PIM client application 108A may present the appointment creation UI 110 to the user 102A on the client device 104A.

In an example, the appointment creation UI 110 may include a UI control for defining an auto-response message. In response to the user 102A activating the UI control for defining the auto-response message, the PIM client application 108A may present an auto-reply message creation UI to the user 102A on the client device 104A. In an example, the user 102A may define the appointment and the auto-reply message via the appointment creation UI 110 and the auto-reply message creation UI. Subsequently, the PIM client application 108A may transmit an appointment creation request 120 to the PIM server application 114, requesting to create the new appointment for the user account associated with the user 102A. In an example, the appointment creation request 120 may include an auto-reply message definition 122 that defines the auto-reply message associated with the appointment.

The PIM server application 114 may receive the auto-reply message definition 122 from the PIM client application 108A. In an example, the auto-reply message definition 122 may be included in the appointment creation request 120, as discussed above.

In an example, in response to receiving the auto-reply message definition 122, the PIM server application 114 may store the auto-reply message definition 122 in the auto-reply data store 124. For example, the auto-reply data store 124 may store multiple auto-reply definitions received by the PIM server application 114. In an example, the appointments may be stored separately by the PIM server application 114 at an appropriate storage location (e.g., in the calendar data store 126).

In another example, in response to receiving the auto-reply message definition 122, the PIM server application 114 may store the auto-reply message definition 122, along with the associated appointment (e.g., which is defined by the appointment creation request 120) in the calendar data store 126. For example, the calendar data store 126 may store one or more appointments, along with one or more associated auto-reply message definitions. That is, the appointments may be stored by the PIM server application 114 along with the associated auto-reply message definitions.

In an example, an email message 128 is received by the PIM server application 114 for a first user account associated with the user 102A. The email message 128 may be transmitted by the user 102B from a second user account, e.g., via the PIM client application 108B executing on the client device 104B. In response to receiving the email message 128, the PIM server application 114 may check the auto-reply data store 124 to determine if an auto-reply message definition stored in the auto-reply data store 124 is currently active. If an auto-reply message definition (e.g., the auto-reply message definition 122) is currently active, the PIM server application 114 may transmit an auto-reply message 130 to the second user account associated with the user 102B, where the auto-reply message 130 may be based on the currently active auto-reply message definition 122.

In another example, the email message 128 is received by the PIM server application 114 for a first user account associated with the user 102A. The email message 128 may be transmitted by the user 102B from a second user account, e.g., via the PIM client application 108B executing on the client device 104B. In response to receiving the email message 128, the PIM server application 114 may check the calendar data store 126 to determine if there is an appointment and an associated auto-reply message definition stored in the calendar data store 126 for the time during which the email message 128 was received. If an auto-reply message definition (e.g., the auto-reply message definition 122) is determined to be active for the time during which the email message 128 was received, the PIM server application 114 may transmit an auto-reply message 130 to the second user account associated with the user 102B. In an example, the auto-reply message 130 may be based on the currently active auto-reply message definition 122.

Figure 2A:
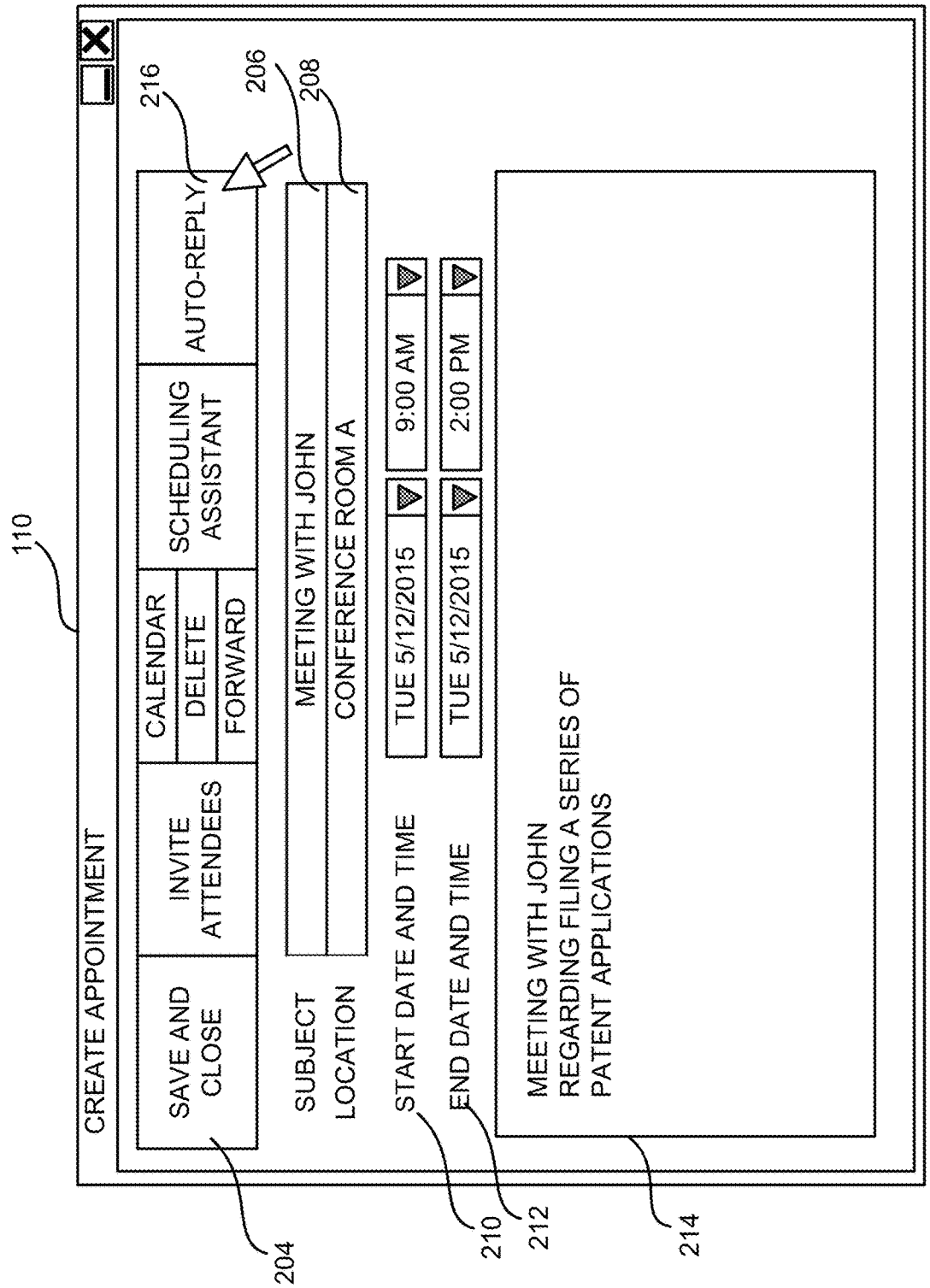
FIG. 2A is a UI diagram that illustrates an example appointment creation UI presented by a personal information management (PIM) client application on a client device, according to one embodiment disclosed herein.

FIG. 2A is a UI diagram that illustrates the example appointment creation UI 110 presented by the PIM client application 108A on the client device 104A. The appointment creation UI 110 of FIG. 2A may include UI controls that are associated with defining the appointment. For example, the appointment creation UI 110 may include UI controls 204 to save and close the appointment, invite attendees to the appointment, view the calendar, delete the appointment, forward the appointment to another user account, view a scheduling assistance (e.g., from which various other parameters of the appointment can be set), and/or the like, as is well known to those skilled in the art.

In an example, the appointment creation UI 110 may also include a UI control 206 to set up a "Subject" of the appointment, where the subject provides a high level description of the appointment. In an example, the appointment creation UI 110 may also include a UI control 208 to set up a location for the appointment.

In an example, the appointment creation UI 110 may also include a UI control 210 to set up a start date and time of the appointment, and a UI control 212 to set up an end date and time of the appointment. Merely as an example, the appointment creation UI 110 illustrates the start date and time of the appointment to be May 12, 2015, at 9:00 AM, and the end date and time of the appointment to be May 15, 2012 at 2:00 PM. In an example, the appointment creation UI 110 may also include a UI control 214 to set up a message associated with the appointment, where the message includes text that describe the appointment.

In an embodiment, the appointment creation UI 110 may also include a UI control 216 to define or set up an auto-reply message, while defining the appointment. In response to the user 102A activating the UI control 216 for defining the auto-reply message, another UI to define the auto-reply message may be presented by the PIM client application 108A on the client device 104A. Details of such a UI are shown in FIG. 2B and described below.

Figure 2B:
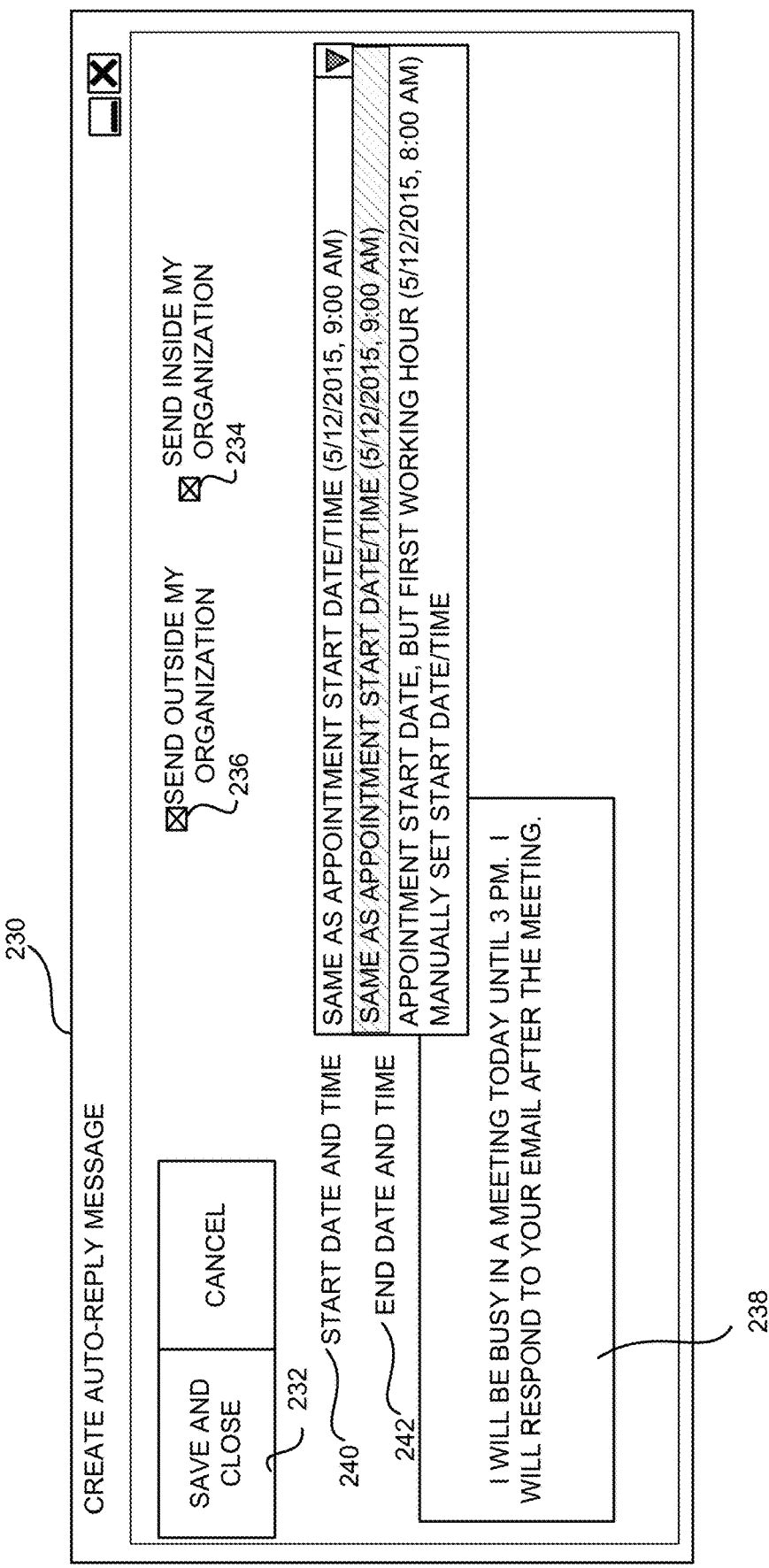
FIG. 2B is a UI diagram that illustrates an example auto-reply message creation UI presented by the PIM client application on the client device, according to one embodiment disclosed herein.

FIG. 2B is a UI diagram that illustrates an example auto-reply message creation UI 230 presented by the PIM client application 108A on the client device 104A. In an example, the auto-reply message creation UI 230 may be presented in response to the user 102A activating the UI control 216 in the appointment creation UI 110 of FIG. 2A. In an example, the user 102A may define an auto-reply message via the auto-reply message creation UI 230.

In an example, the auto-reply message creation UI 230 may include UI controls that are usually available for defining an auto-reply message. For example, the auto-reply message creation UI 230 may include UI controls 232 for saving and closing the definition of the auto-reply message, cancelling the auto-reply message, and/or the like.

Assume that a user account of the user 102A, which the user 102A uses to log in the PIM client application 108A, is associated with an organization. In an example, the auto-reply message creation UI 230 may include a UI control 234 to specify whether the auto-reply message is to be generated in response to emails from senders within the organization. In an example, the auto-reply message creation UI 230 may also include a UI control 236 to specify whether the auto-reply message is to be generated in response to emails from senders from outside the organization. The auto-reply message creation UI 230 may also include a UI control 238 to define the body or text of the auto-reply message.

The auto-reply message creation UI 230 may also include a UI control 240 for setting up a start date and time of the auto-reply message definition, and a UI control 242 for setting up an end date and time of the auto-reply message definition. In an example, the default value of the UI control 240 (i.e., the default value of the start date and time) may be set to the start date and time of the appointment (e.g., as entered in the appointment creation UI 110 of FIG. 2A).

A drop down menu UI control associated with the UI control 240 may also enable the user 102A to select the same start date of the appointment, but a different start time. For example, in the example of FIG. 2A, the appointment start time is 9:00 AM. Also, assume that a typical workday for the user 102A starts at 8:00 AM. The user 102A may be busy preparing for the appointment from 8:00 Am to 9:00 AM. Accordingly, in an example, the drop down menu associated with the UI control 240 may also enable the user 102A to select the same start date of the appointment, but have the first working hour (e.g., 8:00 AM) of the user 102A as the start time for the auto-reply message definition.

In an example, the drop down menu associated with the UI control 240 may also enable the user 102A to manually set the start time for the auto-reply message definition. For example, selecting this option from the UI control 240 may enable the user to select any appropriate start date and/or time for the auto-reply message definition.

In the example of FIG. 2B, the "Same as appointment start date/time (May 12, 2015, 9:00 AM)" option is highlighted, thereby implying that the user has selected the start date and time of the appointment as the start date and time for the auto-reply message definition.

Similar to setting the start date and time for the auto-reply message definition, the end date and time for the auto-reply message definition may also be set via the UI control 242 of the auto-reply message creation UI 230. For example, the UI control 242 may provide a drop down menu UI control (not illustrated in FIG. 2B) that provides (i) a first pre-set option to set the end date and time for the auto-reply message definition to be same as the end date and time for the appointment, (ii) a second pre-set option to set the end date for the auto-reply message definition to be same as the end date for the appointment, and set the end time for the auto-reply message definition to be the last working hour of the user 102A, and (iii) a third option to manually set the end date and time for the auto-reply message definition. In an example, the example auto-reply message creation UI 230 may also include one or more other UI controls that are used for defining various other parameters of an auto-reply message definition. Once the user saves the auto-reply message definition (e.g., via the UI control 232), the appointment creation UI 110 of FIG. 2A is updated.

In an example, the UIs of FIGS. 2A and 2B may be integrated into a single UI. For example, although not illustrated in the figures, a single UI may enable a user to create an appointment and also define an auto-reply message (e.g., by integrating the functionality of the UIs of FIGS. 2A and 2B in a single UI).

Figure 2C:
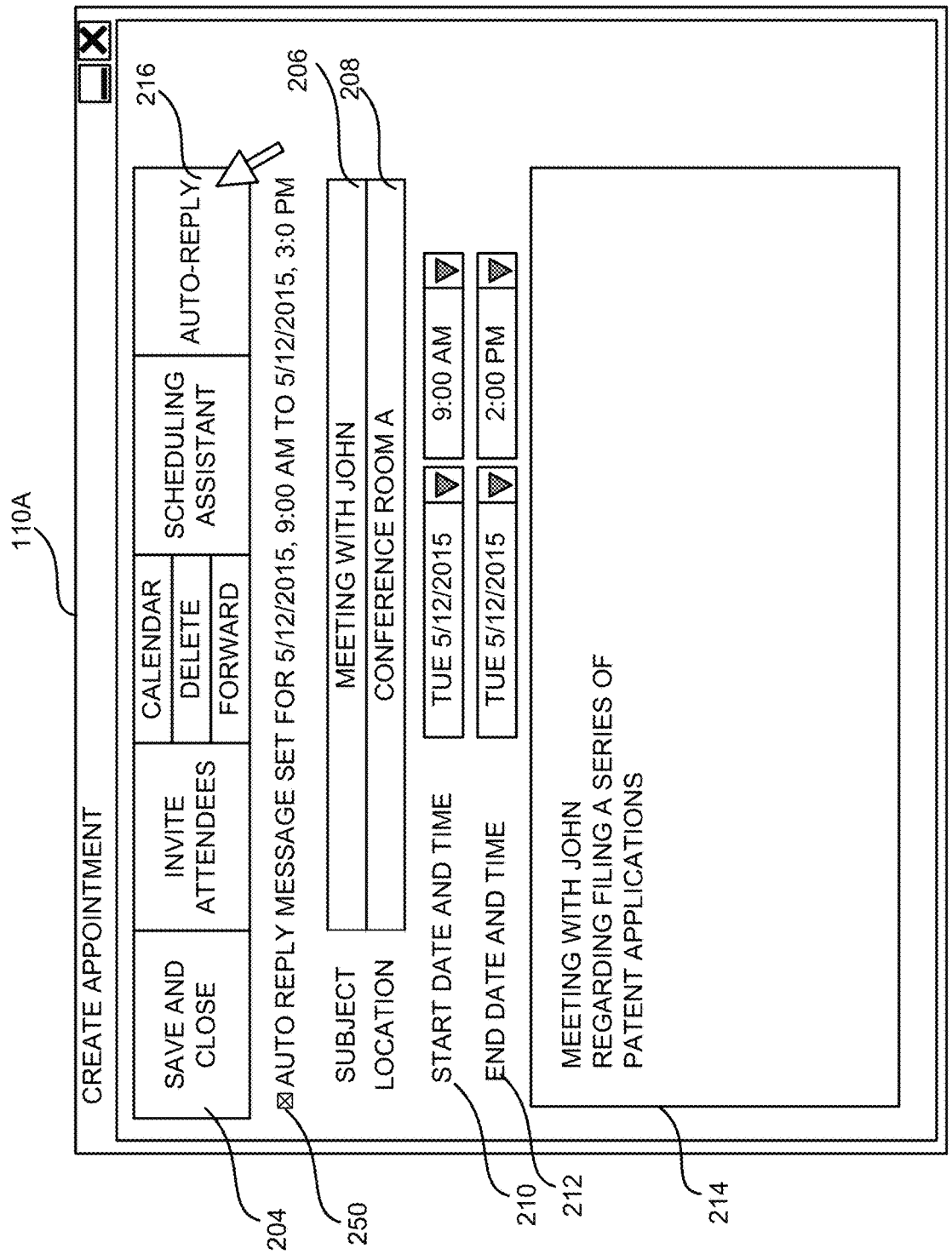
FIG. 2C is a UI diagram that illustrates an example appointment creation UI presented by the PIM client application on the client device, where the appointment creation UI has been updated to reflect that an associated auto-reply message has been set, according to one embodiment disclosed herein.

FIG. 2C is a UI diagram that illustrates an example appointment creation UI 110A presented by the PIM client application 108A on the client device 104A, where the appointment creation UI 110A has been updated to reflect that an associated auto-reply message has been set. For example, the appointment creation UI 110A of FIG. 2C is at least in part similar to the appointment creation UI 110 of FIG. 2A. In an example, the appointment creation UI 110A of FIG. 2C displays an indication 250 to indicate that an auto-reply message has been set. The indication 250, for example, also displays a start date and time, and an end date and time of the auto-reply message, as defined in the auto-reply message creation UI 230 of FIG. 2B.

In the example of FIG. 2B, two pre-set options (e.g., in addition to manually setting the date and time) are provided for the start date and time for the auto-reply message. However, in another example (and not illustrated in the figures), one or more other options may also be provided for start date/time and/or end date/time. For example, the PIM client application 108A may analyze a type, duration and/or other characteristics of the created appointment, and set options for the start date/time and/or end date/time based on such analysis.

For example, if a user creates an appointment for multiple days of vacation, the UI 230 may provide an option to set the start date/time of the auto-reply message to be the end of the previous business day before the vacation, and the UI 230 may provide an option to set the end date/time of the auto-reply message to be the start of the next business day after the vacation. For example, assume that the user may set an appointment for a vacation from Monday, Jun. 15, 2015 to Friday, Jun. 19, 2015. It is likely that the user may out on vacation from Friday evening or night (although the user may set in the calendar that the vacation starts from Monday). The PIM client application 108A may categorize the appointment as a multi-day vacation (in an example, the appointment creation UI 110 may include a UI control to define the type of appointment, e.g., whether the appointment is for vacation or an office work). Based on such categorization, the UI 230 may also provide an option (e.g., in addition to the options illustrated in FIG. 2B) for setting up a start time of the auto-reply message to coincide with the end time of the previous business day before the commencement of the vacation, e.g., 5:00 PM of Friday, Jun. 12, 2015. Also, the UI 230 may provide an option for setting up the end time of the auto-reply message to coincide with the start time of the next business day, i.e., at 8:00 AM of Monday, Jun. 22, 2015 (e.g., based on an assumption that the user may return from the vacation on Sunday evening or night, and may not want to reply to e-mail messages before resuming office on Monday morning).

In another example, if a user creates an appointment for a single whole day (e.g., personal day off), the PIM client application 108A may categorize the appointment as a single whole day out of office. Based on such categorization, the UI 230 may provide an option to set the start date/time of the auto-reply message to be at 8:00 PM of the previous day (e.g., instead of 5:00 PM of the previous day), and the UI 230 may provide an option to set the end date/time of the auto-reply message to be at 8:00 PM of the day of the appointment. This, for example, may be based on the assumption that as the user is out only for a day, it is likely that the user may be online by the evening or night of that day to respond to e-mail messages (and may also be available for responding to e-mails the previous night).

FIG. 3 is a UI diagram that illustrates a calendar 300 displayed by the PIM client application 108A on the client device 104A. In an example, the calendar 300 displays the month of May 2015, although the PIM client application 108A may be configured such that the calendar 300 displays any different month of the calendar, or displays a specific date or a year. In an example, the calendar 300 displays appointments that are set for a user for the month of May 2015.

As discussed previously herein, an appointment may have an associated auto-reply message defined (e.g., defined via the auto-reply message creation UI 230 of FIG. 2B), although auto-reply messages may not be defined for all the appointments that are set via the PIM client application 108A. In an example, the calendar 300 displays appointments, for which associated auto-reply messages have been defined, in a first display format, and displays appointments for which no associated auto-reply messages have been defined in a second display format. For example, in the example of FIG. 3, the appointments that have associated auto-reply messages defined are displayed using hatched lines, and the appointments that do not have associated auto-reply messages defined are displayed without hatched lines. For example, the calendar 300 includes an appointment 302, for which an associated auto-reply message has been defined, and also includes an appointment 304, for which an associated auto-reply messages has not been defined. Accordingly, in FIG. 3, the appointment 302 is illustrated using hatched lines, whereas the appointment 304 is illustrated without any hatched lines.

In an example, the user 102A may readily and visually identify, by viewing the calendar 300, the appointments for which associated auto-reply messages have been defined. Although FIG. 3 differentiates the two types of appointments using hatched lines, in other example, these two types of appointments can be differentiated in the calendar 300 using other types of display formats (e.g., using different types of fonts, different colors, etc.).

As also illustrated in FIG. 3, multiple auto-reply messages may be defined for corresponding multiple time periods via the PIM client application 108A. In an example, the user 102A may desire to view a list of all the auto-reply messages that have been set for a specific time period. FIG. 4 is a UI diagram that illustrates a UI 400 for viewing auto-reply message definitions. For example, the UI 400 is configured to display auto-reply message definitions that are set to be activated for the month of May 2015, although the UI 400 may be configured to display auto-reply message definitions that are set to be activated at another time period.

In an example, the UI 400 displays start date and time, and end date and time for individual ones of the displayed auto-reply message definitions. In another example, the UI 400 also displays the subject associated with the displayed auto-reply message definitions.

In yet another example, for a displayed auto-reply message definition, the UI 400 also displays a UI control 404 to edit the auto-reply message definition and a UI control 406 to delete the auto-reply message definition. For example, the user 102A may select the UI control 406 to delete the corresponding auto-reply message definition, and the user 102A may select the UI control 404 to edit the corresponding auto-reply message definition.

Figure 5A:
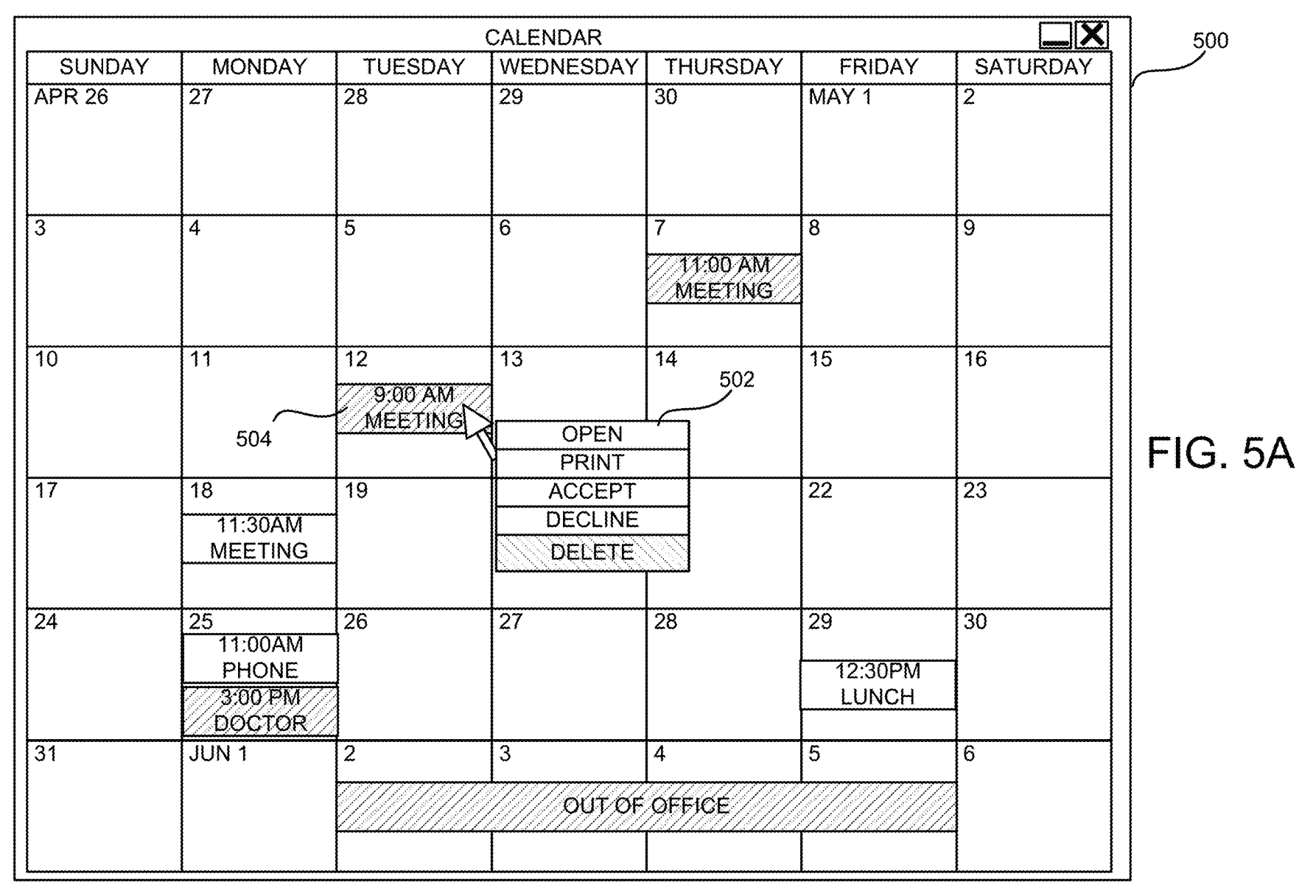

FIG. 5A is a UI diagram that illustrates a calendar 500 displayed by the PIM client application 108A on the client device 104A. Similar to the calendar 300 of FIG. 3, the calendar 500 displays appointments, for which associated auto-reply messages have been defined, in a first display format (e.g., using hatched lines), and displays appointments, for which no associated auto-reply messages have been defined, in a second display format (e.g., without hatched lines). FIG. 5A also illustrates a UI control 502 associated with processing an appointment. For example, the UI control 502 is activated for an appointment 504, for which an associated auto-reply message has been defined. In an example, the UI control 502 may activated by a right-click of a mouse, when the mouse hovers over the appointment 504. The UI control 502 may also be activated by any other appropriate manner, e.g., by selecting the appointment 504, and then activating the UI control 502 via a menu using another type of user input device.

In an example, the UI control 502 may include various options associated with the appointment 504, e.g., opening the appointment 504, printing the appointment 504, accepting or declining the appointment 504, etc. In an example, the UI control 502 may also include an option to delete the appointment 504.

Figure 5B:
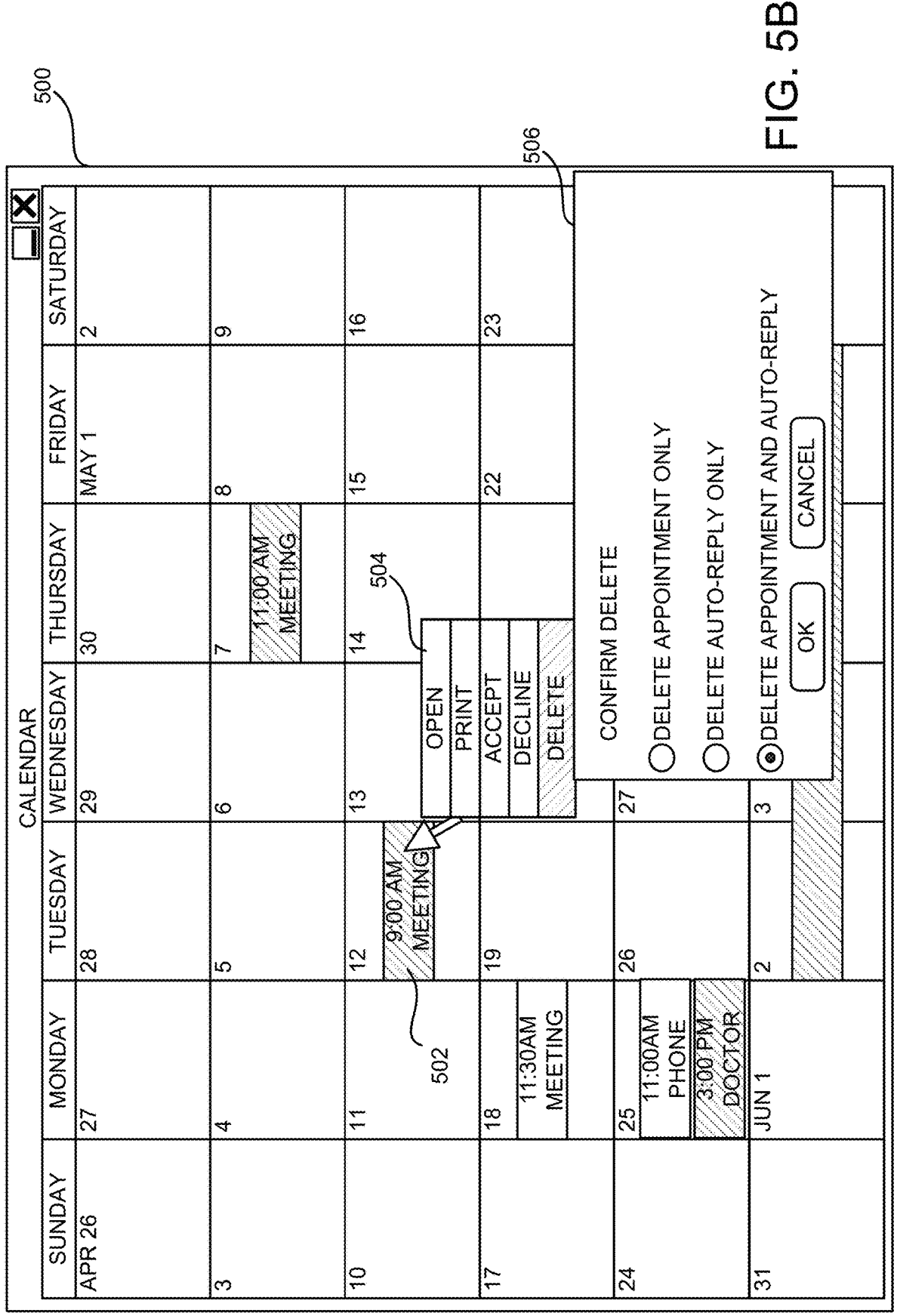
FIG. 5B is a UI diagram that illustrates a UI control to delete a calendar appointment and/or an associated auto-reply message definition, according to one embodiment disclosed herein.

As discussed, an auto-reply message has been defined for the appointment 504. Accordingly, in an example, selecting the option to delete the appointment 504, via the UI control 502, opens another UI control 506, as illustrated in FIG. 5B. In an example, the UI control 506 provides a first option to delete only the appointment 504 (and not delete the associated auto-reply message definition), a second option to delete only the associated auto-reply message definition (and not delete the appointment 504), and a third option to delete both the appointment 504 and the associated auto-reply message definition. The user 102A may select one of the options via the UI control 506.

In an example, if the user deletes only the appointment 504 (but does not delete the associated auto-reply message), the auto-reply message definition may not be associated with a corresponding appointment. As previously discussed herein, the calendar 300 of FIG. 3 displays appointments, for which associated auto-reply messages have been defined, in a first display format; and displays appointments, for which no associated auto-reply messages have been defined, in a second display format. In an example (and although not illustrated in FIG. 3), an auto-reply message definition, which is not associated with any corresponding appointment, is displayed using a third display format that is different from the first and second display formats.

Figure 6A:
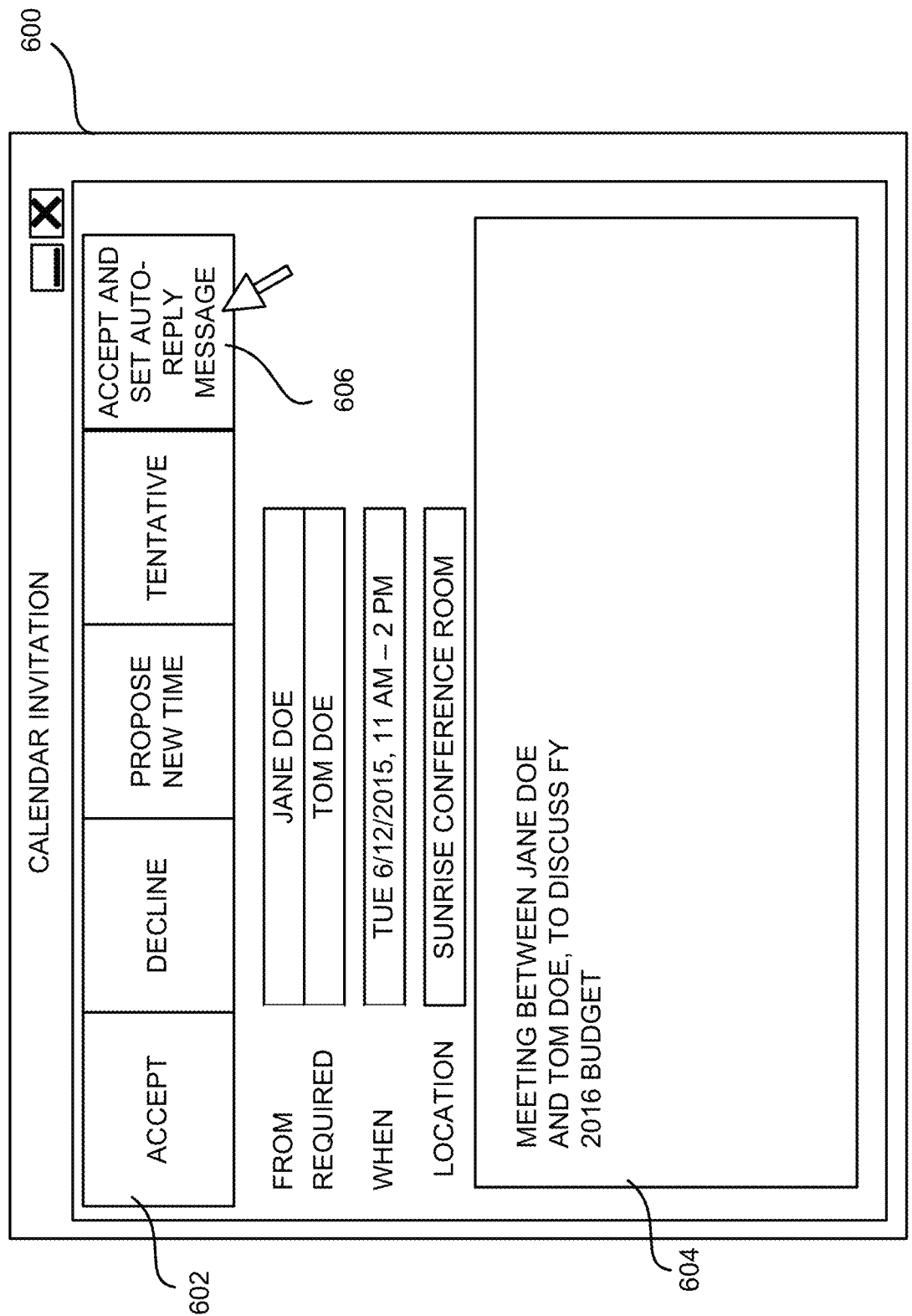
FIG. 6A is a UI diagram that illustrates an example UI presented by the PIM client application on the client device to accept an appointment invitation, according to one embodiment disclosed herein.

FIG. 6A is a UI diagram that illustrates an example UI 600 presented by the PIM client application 108A on the client device 104A to accept an appointment invitation. In an example, the UI 600 may be presented by the PIM client application 108A on the client device 104A in response to the user account of the user 102A receiving an appointment invitation from a different user. In an example, the UI 600 is an invite acceptance UI to accept an appointment invitation and also define an auto-reply message.

The UI 600 may include UI controls that are associated with accepting an appointment invitation. For example, the UI 600 may include UI controls 602 to accept the appointment invitation, decline the appointment invitation, propose a new time for the appointment invitation, indicate a tentative participation for the appointment invitation, and/or the like. In an example, the UI 600 may display a sender of the appointment invitation, required participants for the appointment invitation, a proposed time and location of the appointment invitation, and/or the like. In an example, the UI 600 may also include a UI control 604 that displays a message or a description associated with the appointment invitation.

Figure 6B:
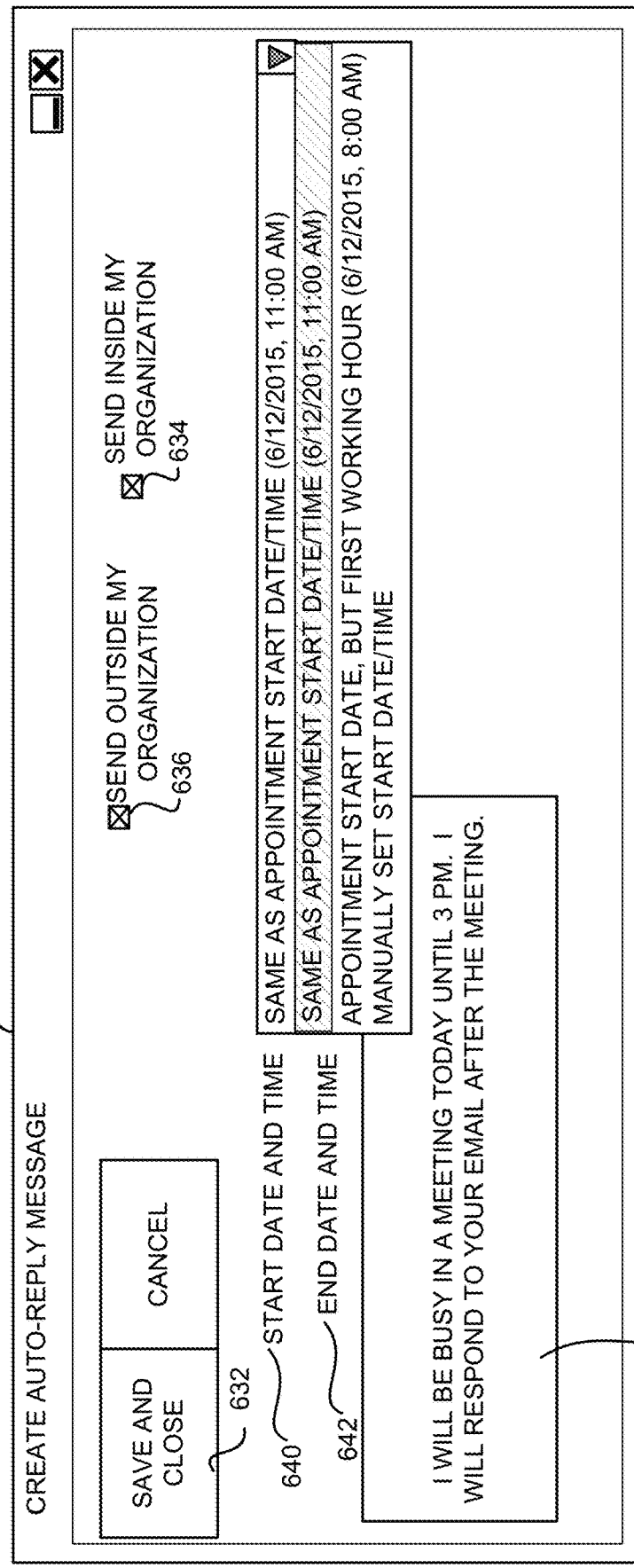
FIG. 6B is a UI diagram that illustrates an example auto-reply creation UI presented by the PIM client application on the client device, according to one embodiment disclosed herein.

In an example, in addition to the UI controls 602 for accepting the appointment invitation, the UI 600 also includes a UI control 606 for accepting the appointment invitation and setting an auto-reply message associated with the appointment invitation. In an example, upon a selection of the UI control 606, a UI 630 is presented by the PIM client application 108A on the client device 104A. FIG. 6B illustrates the UI 630. The user may define an auto-reply message associated with the appointment invitation via the UI 630. In an example, the UI 630 may be at least in part similar to the UI 230 of FIG. 2B, and accordingly, the UI 630 is not discussed in further detail herein.

Figure 6C:
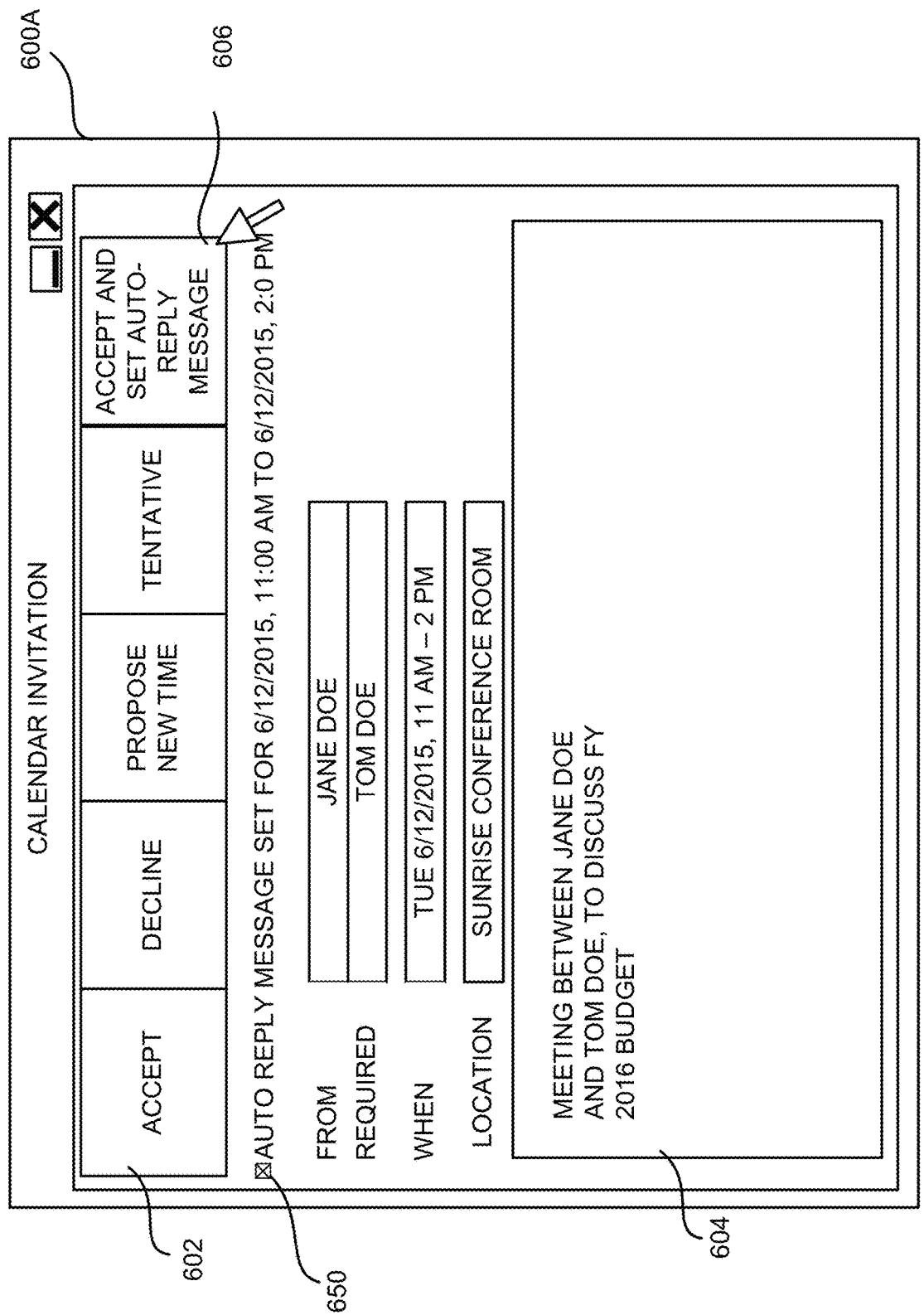
FIG. 6C is a UI diagram that illustrates an example UI presented by the PIM client application on the client device to accept an appointment invitation, where the UI has been updated to reflect that an associated auto-reply message has been set, according to one embodiment disclosed herein.

In an example, once the user 102A saves the auto-reply message definition (e.g., via the UI control 630), the UI 600 of FIG. 6A is updated. FIG. 6C illustrates an example UI 600A presented by the PIM client application 108A on the client device 104A, where the UI 600A is similar to the UI 600, but updated to reflect that an associated auto-reply message has been set for the appointment invitation. For example, the UI 600A of FIG. 6C is at least in part similar to the UI 600 of FIG. 6A. In an example, the UI 600A of FIG. 6C displays an indication 650 to indicate that an auto-reply message has been defined for the appointment invitation. The indication 650, for example, also displays a start date and time, and an end date and time of the auto-reply message, as defined in the UI 630 of FIG. 6B.

FIGS. 2A-6C illustrate various example UIs. It is to be noted that the UIs, the UI controls, arrangements of the UI controls in these figures are illustrative examples, and different types, numbers and/or arrangements of UIs and UI controls can also be used. In an example, the technologies disclosed herein may be provided through one or more web-based UIs.

Figure 7A:
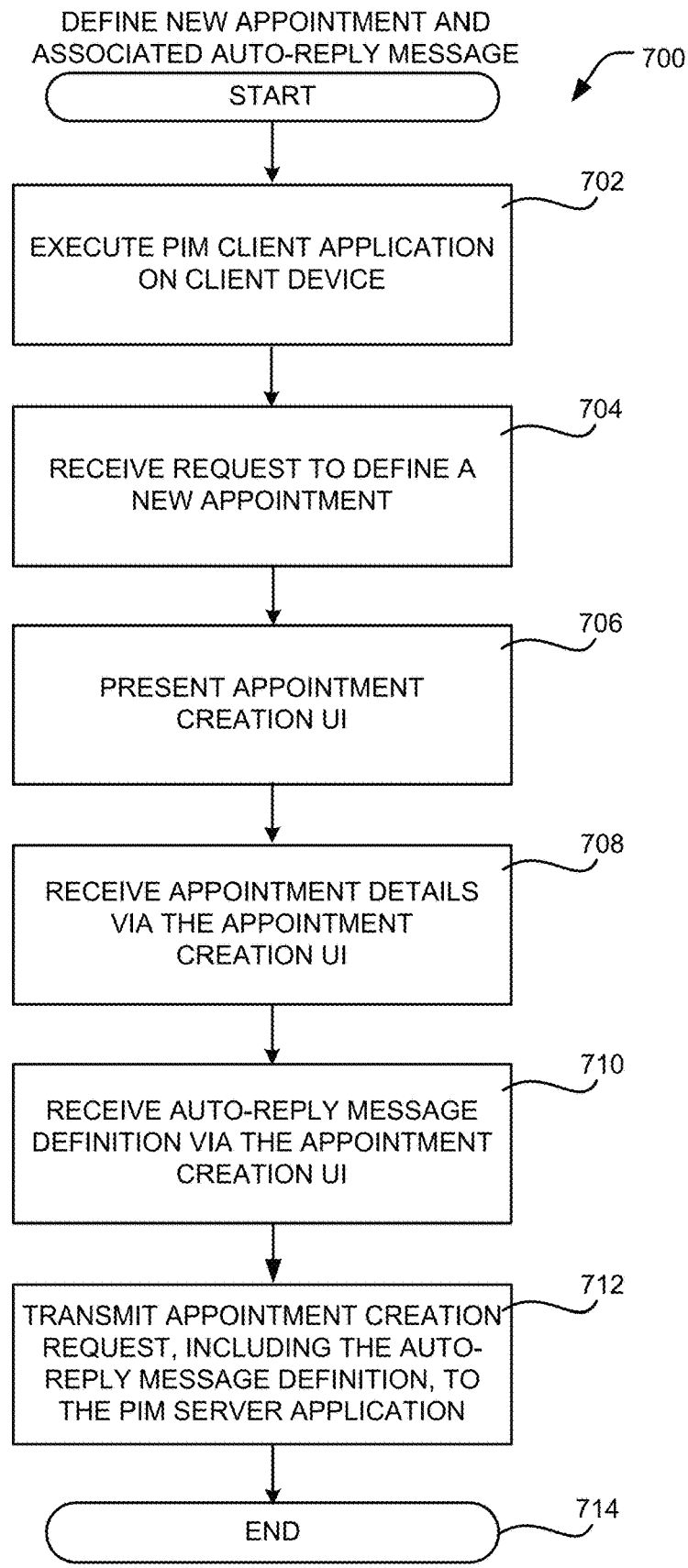
FIG. 7A is a flow diagram showing a routine that illustrates aspects of the operation of one mechanism disclosed herein for defining a new appointment on a calendar and an associated auto-reply message, according to one embodiment disclosed herein.

FIG. 7A is a flow diagram showing a routine 700 that illustrates aspects of the operation of one mechanism disclosed herein for defining a new appointment on a calendar and an associated auto-reply message, according to one embodiment disclosed herein. It should be appreciated that the logical operations described herein with respect to FIG. 7A, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 700 begins at operation 702, where the PIM client application 108A executes on the client device 104A. In response to the user 102A requesting to define a new appointment in a calendar of the PIM client application 108A, the routine 700 proceeds from 702 to 704, where the PIM client application 108A receives the request for defining a new appointment on a calendar associated with a user account of the user 102A.

In response to receiving the request at operation 704, the routine 700 proceeds from operation 704 to operation 706, where the PIM client application 108A presents the appointment creation UI 110 on the client device 104A. The appointment creation UI 110, for example, includes UI controls 204, 206, 208, 210, 212 and 214 to define the new appointment. The appointment creation UI 110, for example, also includes the UI control 216 to define an associated auto-reply message, as illustrated in FIG. 2A.

The routine 700 then proceeds from operation 706 to operation 708, where the PIM client application 108A receives details of the appointment via the appointment creation UI 110. The routine 700 then proceeds from operation 708 to operation 710, where the PIM client application 108A also receives the auto-reply message definition 122 via the appointment creation UI 110.

The routine 700 then proceeds from operation 710 to operation 712, where the PIM client application 108A transmits the appointment creation request 120 to the PIM server application 114, e.g., via the network 116. In an example, the appointment creation request 120 also includes the auto-reply message definition 122. The routine 700 then ends at operation 714.

Figure 7B:
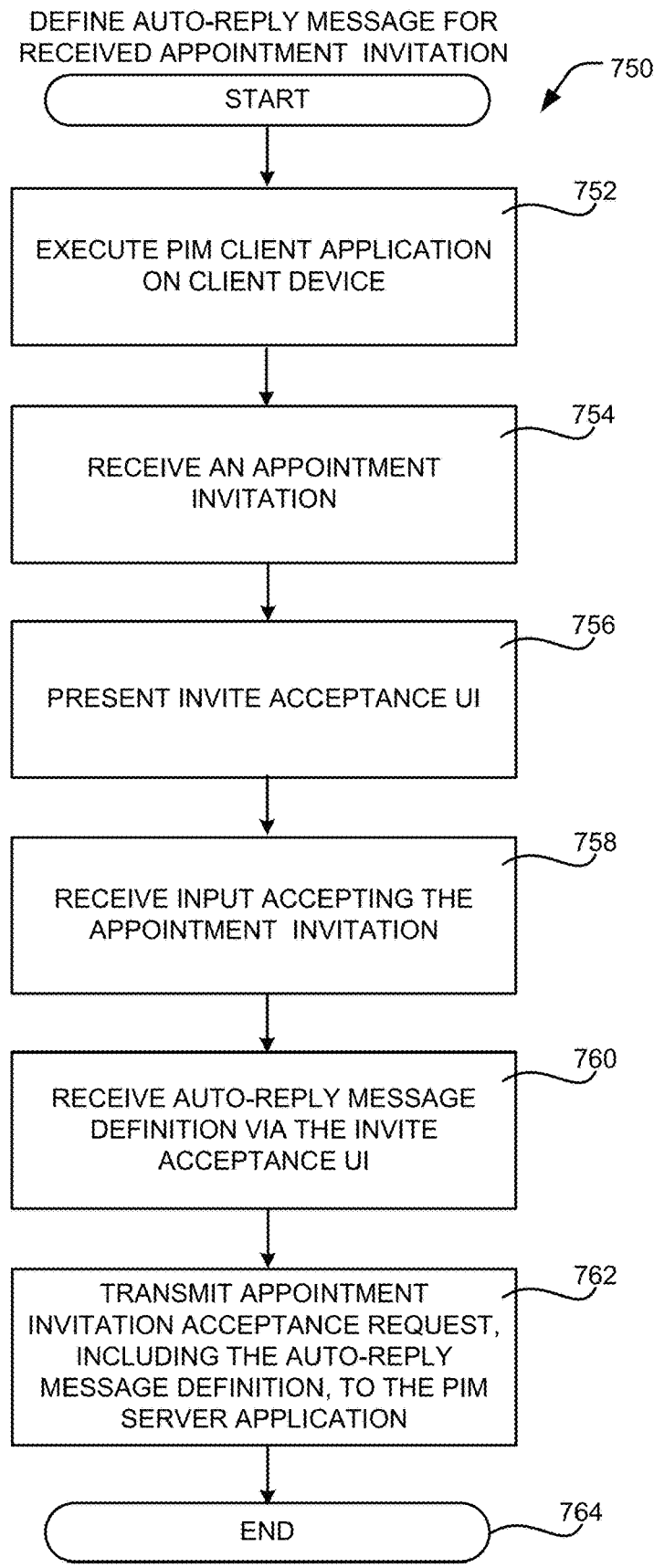
FIG. 7B is a flow diagram showing a routine that illustrates aspects of the operation of one mechanism disclosed herein for defining an auto-reply message for a received appointment invitation, according to one embodiment disclosed herein.

FIG. 7B is a flow diagram showing a routine 750 that illustrates aspects of the operation of one mechanism disclosed herein for defining an auto-reply message for a received appointment invitation, according to one embodiment disclosed herein. The routine 750 begins at operation 752, where the PIM client application 108A executes on the client device 104A. The routine 750 proceeds from 752 to 754, in which the PIM client application 108A receives a new appointment invitation that is directed to a user account of the user 102A. In an example, the new appointment invitation is transmitted from another user account (e.g., a user account of the user 102B, transmitted via the client device 104B).

The routine 750 proceeds from 754 to 756, in which the PIM client application 108A presents the invite acceptance UI 600 of FIG. 6A. In an example, the invite acceptance UI 600 includes at least one UI control for accepting the new appointment invitation and for defining the auto-reply message.

In response to the user 102A accepting the new appointment invitation and defining an auto-reply message (e.g., via the UI control 606 of the UI 600 of FIG. 6), the routine 750 proceeds from 756 to 758, in which the PIM client application 108A receives an input accepting the new appointment invitation. The routine 750 then proceeds from 758 to 760, in which the PIM client application 108A receives an auto-reply message definition via the invite acceptance UI 600.

The routine 750 then proceeds from operation 760 to operation 762, where the PIM client application 108A transmits an appointment invitation acceptance request, including the auto-reply message definition, to the PIM server application 114, e.g., via the network 116. The routine 750 then ends at operation 764.

Figure 8:
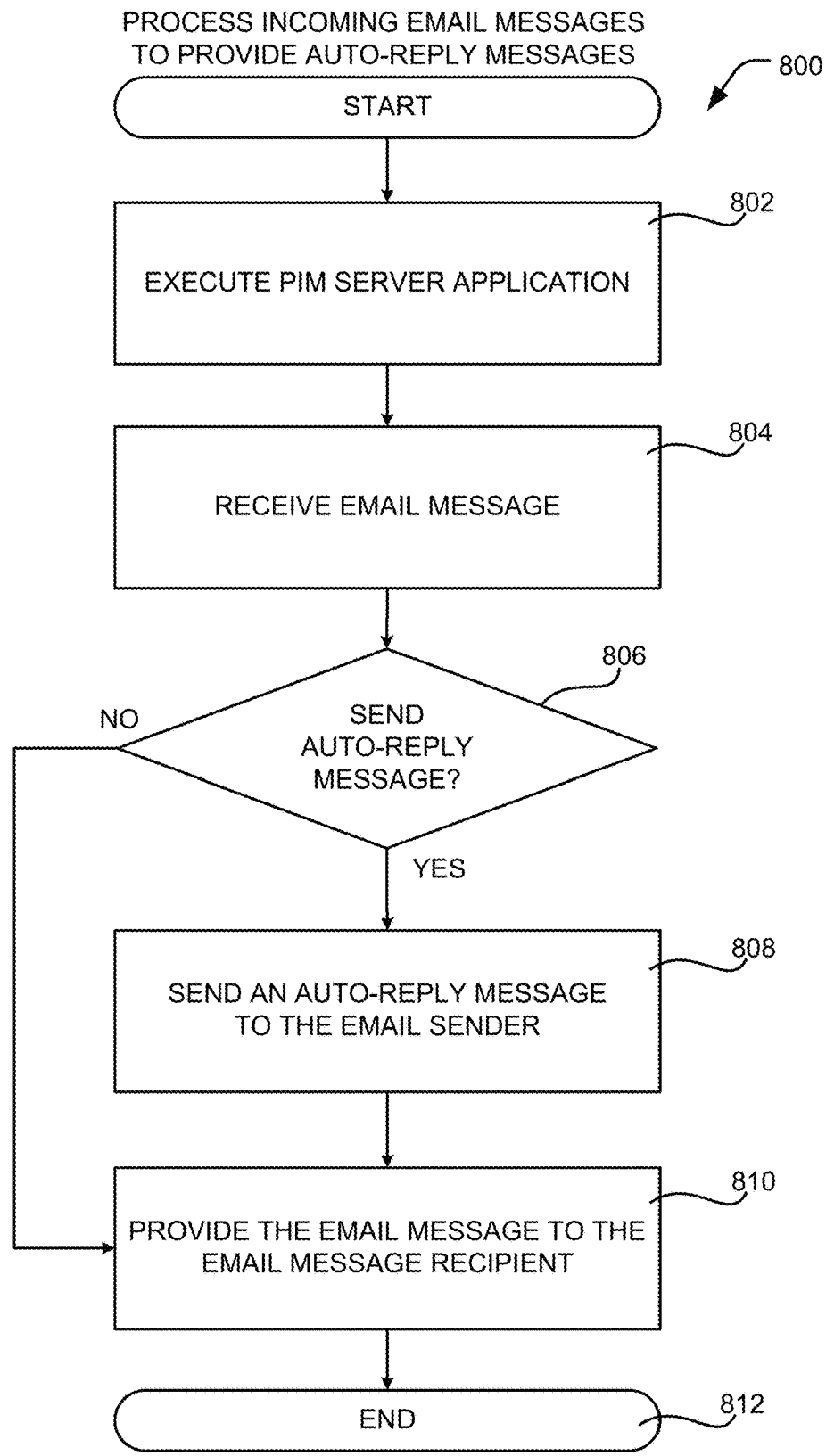
FIG. 8 is a flow diagram showing a routine that illustrates aspects of the operation of one mechanism disclosed herein for processing incoming email messages to provide an auto-reply message, according to one embodiment disclosed herein.

FIG. 8 is a flow diagram showing a routine 800 that illustrates aspects of the operation of one mechanism disclosed herein for processing incoming email messages to provide an auto-reply message, according to one embodiment disclosed herein. The routine 800 begins at operation 802, where the PIM server application 114 executes on the PIM server computer 112. The routine 800 proceeds from 802 to 804, in which the PIM server application 114 receives an email message 128 which, for example, is directed to the email address of the user 102A. In an example, the email message 128 is transmitted from another user account (e.g., a user account of the user 102B, transmitted via the client device 104B).

The routine 800 proceeds from 804 to 806, in which the PIM server application 114 determines if an auto-reply message is to be transmitted in response to the email message 128. For example, the PIM server application 114 checks the auto-reply data store 124 and/or the calendar data store 126 to determine if an auto-reply message definition is active at the time the email message 128 is received. In another example (e.g., assuming that an auto-reply message definition is active at the time the email message 128 is received), if the email message 128 is received from outside the organization in which the user in employed, the PIM server application 114 checks the currently active auto-reply message definition to determine if the currently active auto-reply message definition is set for replying to emails messages from outside the organization. In another example, one or more parameters of the email message 128 (e.g., a sender of the e-mail message, whether the e-mail message includes an attachment, etc.) is checked against one or more requirements set in the currently active auto-reply message definition to determine if an auto-reply message is to be transmitted in response to the email message 128.

If an auto-reply message definition (e.g., the auto-reply message definition 122) is active (i.e., if "Yes" at operation 806), the routine 800 proceeds from 806 to 808, in which the PIM server application 114 sends the auto-reply message 130 to the sender of the email message 128. The routine 800 proceeds from 808 to 810, in which the PIM server application 114 provides the email message 128 to the email message recipient, i.e., provides the email message 128 to the user account of the user 102A.

At operation 806, if no auto-reply message definition is active at the time the email message 128 is received (i.e., if "No" at operation 806), the routine 800 then proceeds from 806 to 810, in which the PIM server application 114 provides the email message 128 to the email message recipient. After the operation 810, the routine 800 ends at operation 812.

Figure 9:
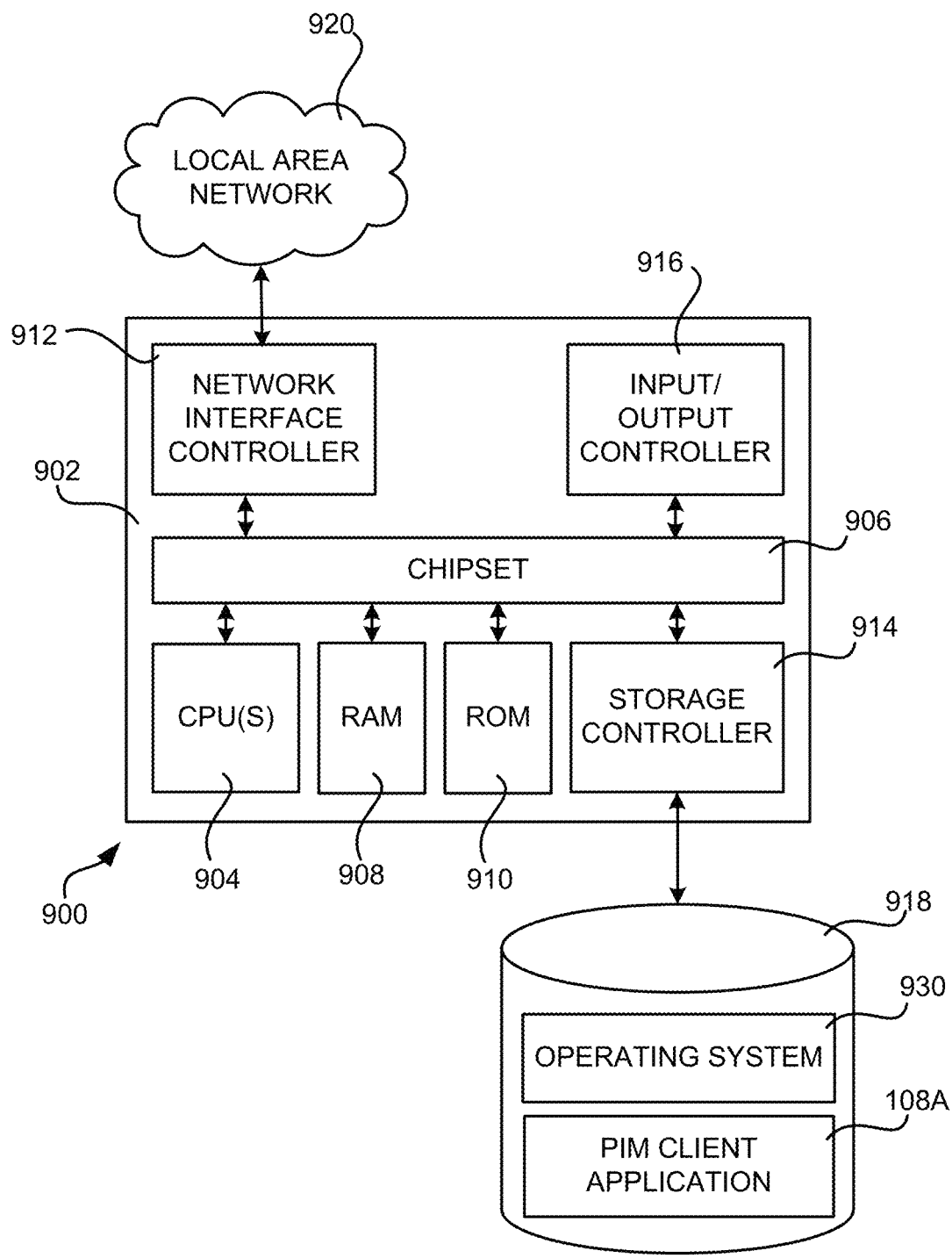
FIG. 9 shows an example computer architecture for a computer capable of executing the program components described herein for defining an auto-reply message while defining a new appointment for a calendar.

FIG. 9 shows an example computer architecture for a computer 900 capable of executing the program components described above for defining an auto-reply message while defining a new appointment for a calendar. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute the PIM client application 108A or the PIM client application 108B described above on a client device in the system architecture of FIG. 1. The computer architecture shown in FIG. 9 might also be utilized to implement the PIM server application 114 described above on the PIM server computer 112 in the system architecture of FIG. 1.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a NIC 912, such as a gigabit Ethernet adapter. The NIC 912 is capable of connecting the computer 900 to other computing devices over the network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. As used herein, the term computer-readable storage media does not encompass transitory signals per se.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900, such as PIM client application 108A and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 7A, 7B and 8. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for defining an auto-reply message while defining a calendar appointment. have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus comprising:
one or more controllers to receive input from an input device and present output to an output device, the output device including one or more user interfaces, wherein the input device and the output device are either included in a single device or included in different devices;
a processor connected to the one or more controllers; and
a non-transitory computer-readable storage medium including instructions stored thereon, the instructions including a personal information management (PIM) client application, and when the instructions are executed by the processor, cause the apparatus to:
execute the PIM client application, the PIM client application causing a calendar associated with a first user account to be displayed on the output device;
receive an appointment invitation directed to the first user account from a second user account;
provide a first user interface to the output device, the first user interface allowing an input from the input device to accept the appointment invitation for the calendar of the first user account and, if the input is to accept the appointment invitation, to allow further input from the input device that specifies an auto-reply message associated with the appointment invitation, and sets a start date and time and an end date and time for which the auto-reply message is active;
determine that the input from the input device is to accept the appointment invitation;
receive input from the input device specifying the auto-reply message, and the start date and time and the end date and time for which the auto-reply message is active, the start date and time and the end date and time being received as one option selected from among a plurality of options including a default option, a preset option, and a manual option, the plurality of options being presented via the output device, based on input, received via the input device, selecting a single user interface control to be presented via the output device;
store the auto-reply message associated with the appointment invitation, the start date and time, and the end date and time;
receive an incoming electronic message directed to the first user account from a third user account, the incoming electronic message being one of an email message, an instant message, a text message, or a message posted to a social networking website;
determine that the auto-reply message is active when the incoming electronic message is received; and
transmit the auto-reply message to the third user account.

2. The apparatus of claim 1, wherein the instructions, when executed, further cause the apparatus to:
subsequent to a determination that the appointment invitation has been accepted, receive a request from the input device to delete the appointment invitation;
delete the appointment invitation;
provide a second user interface to the output device to allow deletion of the auto-reply message associated with the appointment invitation;
receive, from the input device, an instruction to delete the auto-reply message; and
delete the auto-reply message.

3. The apparatus of claim 1, wherein the appointment invitation is a first appointment on the calendar, wherein the first appointment is associated with the auto-reply message, wherein a second appointment is on the calendar but is not associated with an auto-reply message, and wherein the instructions, when executed, further cause the apparatus to:
provide the calendar to the output device, the calendar including the first appointment and the second appointment, wherein the first appointment is displayed using a first display format, wherein the second appointment is displayed using a second display format that is different from the first display format, and wherein the first display format comprises at least one of hatched lines, a selected color, or a selected font, and the second display format does not include all of the hatched lines, the selected color, and the selected font.

4. The apparatus of claim 1, wherein the instructions, when executed, and subsequent to a determination that the appointment invitation has been accepted, further cause the apparatus to:
present a second user interface that displays a list of one or more auto-reply message definitions that have been previously defined, the second user interface comprising at least one user interface control to edit an auto-reply message definition on the list and at least one user interface control to delete an auto-reply message definition from the list.

5. The apparatus of claim 1, wherein:
the appointment invitation specifies a start date and time and an end date and time associated with the appointment, and
the start date and time and the end date and time associated with the appointment are different from the start date and time and the end date and time set for which the auto-reply message is active.

6. The apparatus of claim 1, wherein the instructions, when executed by the processor, further cause the apparatus to receive the input from the input device specifying the auto-reply message and the start date and time and the end date and time for which the auto-reply message is active, the start date and time and the end date and time being received as the preset option,
wherein the preset option is a typical workday option.

7. The apparatus of claim 1, wherein:
the default option, preset option, and the manual option are presented and vertically aligned via the output device; and
the single user interface control is a same user interface control selected to present the default option, the preset option, and the manual option.

8. A non-transitory computer-readable storage medium including computer-executable instructions stored thereupon which, when executed by a computer having an input device and an output device, wherein the input device and the output device are either included in a single device or included in different devices, cause the computer to:
provide a first user interface to the output device, the first user interface allowing input from the input device to define a first appointment on a calendar, to define a time period associated with the first appointment, to define or select an auto-reply message associated with the first appointment, and to select an active time period for the auto-reply message from a plurality of message time period options, the active time period differing from the time period associated with the first appointment, the auto-reply message being in response to an electronic message received during the active time period, the electronic message being one of an email message, an instant message, a text message, or a message posted to a social networking website;
receive the input from the input device regarding the first appointment, the time period associated with the first appointment, the auto-reply message associated with the first appointment, and the active time period for the auto-reply message;
transmit an appointment creation request to a server application, the appointment creation request comprising a request to create the first appointment on the calendar and specifying the time period associated with the first appointment, the auto-reply message associated with the first appointment, and the active time period for the auto-reply message; and
subsequent to transmittal of the appointment creation request, provide a second user interface to the output device, the second user interface displaying the calendar, the calendar displaying the first appointment and a second appointment, the first appointment using a first display format including a first indication that the first appointment is associated with the auto-reply message that has been defined as being associated with the first appointment, the first appointment subsequently using, based on the auto-reply message being turned off and instead of the first display format, a second display format including a second indication that the auto-reply message is no longer defined as being associated with the first appointment, the second appointment using the second display format including the second indication that an additional auto-reply message associated with the second appointment has not been defined, the second appointment subsequently using the first display format including the first indication that the second appointment is associated with the additional auto-reply message that has been defined as being associated with the second appointment.

9. The non-transitory computer-readable storage medium of claim 8, wherein the instructions, when executed, further cause the computer to:
subsequent to the transmittal of the appointment creation request, receive a request from the input device to delete the first appointment;
provide to the output device one or more user interface controls allowing selection of (i) deleting a definition of the auto-reply message associated with the first appointment, without deleting the first appointment, (ii) deleting the first appointment, without deleting the definition of the auto-reply message associated with the first appointment, or (iii) deleting both the auto-reply message associated with the first appointment and the first appointment;
receiving the selection from the input device; and
transmitting the selection to the server application.

10. The non-transitory computer-readable storage medium of claim 8, wherein another auto-reply message is not associated with any appointment, and wherein the instructions, when executed, further cause the computer, subsequent to the transmittal of the appointment creation request, to:
provide the second user interface to the output device, the calendar displaying the other auto-reply message using a third display format that is different from the first display format and different from the second display format.

11. The non-transitory computer-readable storage medium of claim 8, wherein the instructions, when executed by the computer, and subsequent to receiving the input from the input device regarding the first appointment, the time period associated with the first appointment, the auto-reply message associated with the first appointment, and the active time period for the auto-reply message, further cause the computer to:
provide a third user interface to the output device, the third user interface indicating that a definition of the auto-reply message associated with the first appointment, and indicating a start date, a start time, an end date and an end time of the active time period for the auto-reply message associated with the first appointment.

12. The non-transitory computer-readable storage medium of claim 8, wherein the first user interface displays a list of one or more auto-reply messages previously stored on the server application, and wherein the input from the input device is a selection of one of the one or more auto-reply messages.

13. The non-transitory computer-readable storage medium of claim 12, wherein the first user interface displays at least one user interface control to edit an auto-reply message on the list and at least one user interface control to delete an auto-reply message from the list.

14. The non-transitory computer-readable storage medium of claim 8, wherein the instructions, when executed by the computer, further cause the computer to:

provide that the first user interface also allows input from the input device to select a type of the first appointment; and based on the type selected for the first appointment, present one or more options via at least one user interface control of the first user interface to select the auto-reply message associated with the first appointment.

15. The non-transitory computer-readable storage medium of claim 8, wherein the instructions, when executed by the computer, further cause the computer to:

receive an appointment invitation from a remote device;

provide a third user interface to the output device, the third user interface allowing an input from the input device to accept the appointment invitation, the third user interface further providing at least one user interface control for defining a second auto-reply message to be transmitted in response to messages received during a time period associated with the appointment invitation if the appointment invitation is accepted; and if the appointment invitation is accepted, transmit a reply to the appointment invitation, the reply comprising an acceptance of the appointment invitation.

16. The non-transitory computer-readable storage medium of claim 15, wherein the first user interface further comprises (i) a first user interface control to accept the appointment invitation without defining an associated auto-reply message, and (ii) a second user interface control to accept the appointment invitation and define an associated auto-reply message.

17. The non-transitory computer-readable storage medium of claim 8, wherein the instructions, when executed by the computer, further cause the computer, subsequent to transmittal of the appointment creation request, to:

provide at least one user interface control to the output device allowing input from the input device to change the active time period of the auto-reply message associated with the first appointment.

18. A computer-implemented method for a server connected to a plurality of computer devices, the method comprising:

receiving a plurality of appointment creation requests from a first computer device of the plurality of computer devices;

receiving a plurality of associated auto-reply message definitions for the appointment creation requests from the first computer device, an auto-reply message definition of the plurality of associated auto-reply message definitions defining an auto-reply message for electronic messages received during a message time period of an associated appointment, an electronic message being one of an email message, an instant message, a text message, or a message posted to a social networking website;

receiving a definition of a specific time period from the first computer device;

receiving a request from the first computer device to provide a list of auto-reply messages that are active for the first computer device during the specific time period;

causing display via the first computer device of the list of auto-reply messages that are active; and causing display, via the first computer device, of a start date and time, an end date and time, and a subject of at least one auto-reply message of the auto-reply messages in the list.

19. The method of claim 18, further comprising:

storing the appointment creation requests in a first data store; and storing the auto-reply message definitions in a second data store that is different from the first data store.

20. The computer-implemented method of claim 18, and subsequent to receiving the plurality of appointment creation requests and the plurality of associated auto-reply message definitions, further comprising:

receiving an incoming message from a remote device;

determining that the incoming message is directed to the first computer device;

determining that the auto-reply message for the first computer device is active when the incoming message is received; and transmitting the auto-reply message to the remote device.

21. The method of claim 18, wherein:

causing display of the start date and time, the end date and time, and the subject of the at least one auto-reply message further comprises:

causing display, via an output device of the first computer device, of a first start date and time, a first end date and time, and a first subject of a first auto-reply message in the list; and causing display, via the output device of the first computer device, of a second start date and time, a second end date and time, and a second subject of a second auto-reply message in the list;

the first start date and time, the first end date and time, and the first subject of the first auto-reply message are horizontally aligned for presentation, via the output device; and the second start date and time, the second end date and time, and the second subject of the second auto-reply message are horizontally aligned for presentation, via the output device.

* * * * *